(12) United States Patent
Kerhuel et al.

(10) Patent No.: US 10,404,426 B2
(45) Date of Patent: Sep. 3, 2019

(54) SIGNAL TRANSMISSION METHOD AND TRANSMITTING DEVICE

(71) Applicant: NXP USA, Inc., Austin, TX (US)

(72) Inventors: Samuel Kerhuel, Toulouse (FR); Andrei Alexandru Enescu, Eindhoven (NL)

(73) Assignee: NXP USA, Inc., Austin, TX (US)

( * ) Notice: Subject to any disclaimer, the term of this patent is extended or adjusted under 35 U.S.C. 154(b) by 232 days.

(21) Appl. No.: 15/464,474

(22) Filed: Mar. 21, 2017

(65) Prior Publication Data

US 2018/0167178 A1 Jun. 14, 2018

(30) Foreign Application Priority Data

Dec. 8, 2016 (EP) .................................. 16306643

(51) Int. Cl.
*H04L 5/00* (2006.01)
*H04B 7/04* (2017.01)
*H04W 72/08* (2009.01)
*H04B 7/0456* (2017.01)

(52) U.S. Cl.
CPC ......... *H04L 5/0026* (2013.01); *H04B 7/0456* (2013.01); *H04W 72/082* (2013.01)

(58) Field of Classification Search
None
See application file for complete search history.

(56) References Cited

U.S. PATENT DOCUMENTS

| | | | |
|---|---|---|---|
| 8,553,620 B2* | 10/2013 | Ko .................. | H04B 7/0413 370/328 |
| 9,020,516 B2 | 4/2015 | Abe et al. | |
| 2010/0002800 A1* | 1/2010 | Kim .................. | H04L 5/0037 375/295 |
| 2010/0039928 A1* | 2/2010 | Noh .................. | H04B 7/0617 370/210 |
| 2010/0061360 A1 | 3/2010 | Chen et al. | |
| 2011/0243079 A1* | 10/2011 | Chen .................. | H04B 7/063 370/329 |
| 2011/0299382 A1* | 12/2011 | Van Nee .............. | H04L 27/2613 370/210 |
| 2013/0322376 A1* | 12/2013 | Marinier .............. | H04W 72/06 370/329 |
| 2015/0215014 A1* | 7/2015 | Zhu .................. | H04L 25/0248 375/267 |
| 2016/0149626 A1* | 5/2016 | Frenne .................. | H04B 7/022 375/267 |

* cited by examiner

Primary Examiner — Steve R Young

(57) ABSTRACT

Embodiments include signal transmission methods and transmitting devices for a multi-antenna wireless communication system. The method comprises mapping one or more modulation symbols onto one or more transmission layers, thereby creating one or more modulated transmission layers and mapping the modulation symbols of the one or more modulated transmission layers onto resource elements of respective one or more time-frequency resource grids. The method further comprises performing precoding for each of the one or more time-frequency resource grids.

21 Claims, 3 Drawing Sheets

SIGNAL TRANSMISSION METHOD AND TRANSMITTING DEVICE

FIELD

This invention relates to a signal transmission method and transmitting device for a multi-antenna wireless communication system.

BACKGROUND

Multiple-input multiple-output (MIMO) communication systems offer great increases in the throughput and data rate due to the ability to support multiple parallel data streams that are transmitted on different antennas.

The performance of MIMO communication systems can be further improved by using the closed-loop MIMO technology which is based on the feedback of the channel state information (CSI) from the User Equipment (UE) to the Base Station (BS). Namely, according to CSI, downlink data can be precoded at the BS before being transmitted in order to get better Signal to Noise Ratio (SNR) at the UE side and an overall larger system capacity. Said in other words, precoding is the process of prearranging the transmit signals in MIMO communication systems in consideration of CSI in such a way that the UE can combine the MIMO signals to detect the transmitted signal more reliably.

In classic MIMO communication systems, antenna arrays usually consist of only two, four, or eight physical antennas which are considered for baseband processing. Such arrangements have the advantage of limiting signal processing complexity.

However, with the advent of technologies such as massive MIMO, signal processing complexity is significantly increased. For example, as shown in FIG. 1, Full-Dimensional multiple input multiple output (FD-MIMO) which is a practical implementation of massive MIMO in wireless communication systems, places a large number of active antenna elements in a two-dimensional grid of active antenna arrays GRID at the BS.

Although, this new arrangement allows the extension of spatial separation to the elevation domain as well as the traditional azimuth domain so as to harvest the benefits of both azimuth beamforming $\phi$ and elevation beamforming $\theta$, it significantly increases the complexity of such systems due to the need to process differently a large number of data.

In fact, signal processing complexity at the BS with foregoing arrangement, particularly during the precoding process, can slow down the overall processing due to the large number of physical antennas to consider. Hence, an efficient precoding process is required.

BRIEF DESCRIPTION OF THE DRAWINGS

Further details, aspects and embodiments of the proposed solution will be described, by way of example only, with reference to the drawings. In the drawings, like or similar reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Embodiments of the inventive subject matter provide a signal transmission method and a transmitting device for a multi-antenna wireless communication system, as described in the accompanying claims. Specific embodiments of the inventive subject matter are set forth in the dependent claims. These and other aspects of the inventive subject matter will be apparent from and elucidated with reference to the embodiments described hereinafter.

It is proposed a new transmitting device that can handle the processing of a large number of active antenna elements by precoding time-frequency resource grids with single or multiple instruction stream multiple data stream (SIMD) processors. The time-frequency resource grids are so arranged that large quantities of resource elements are handled in parallel.

Figure 1:
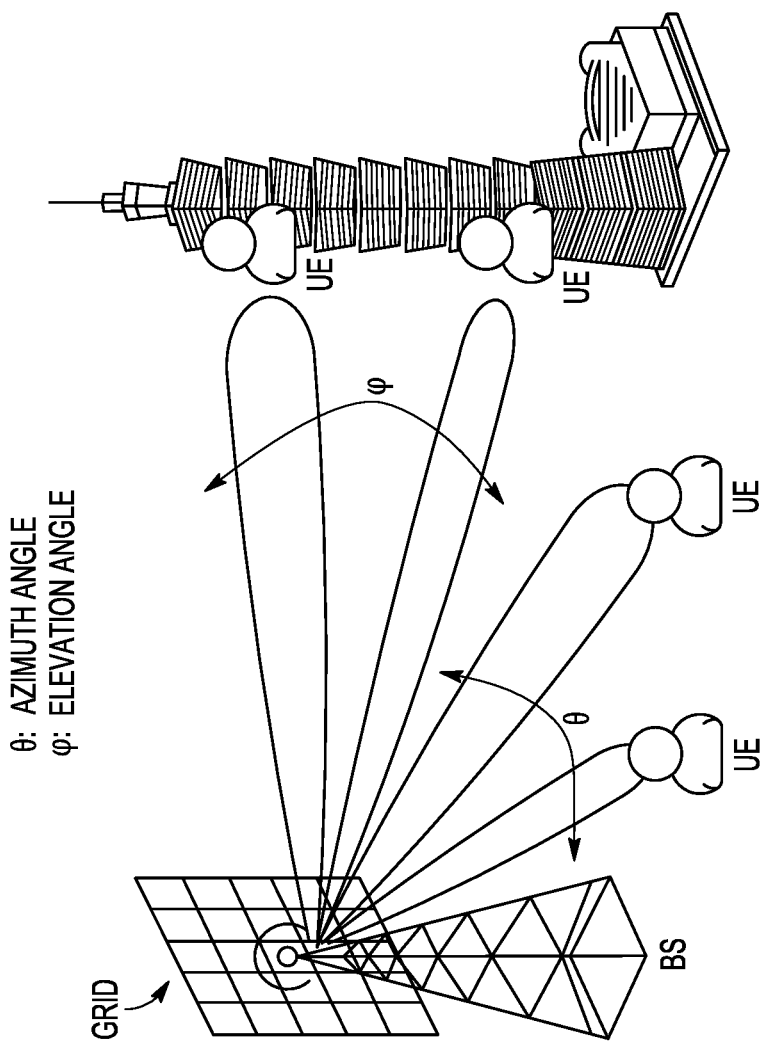
FIG. 1 is a simplified diagram of a Full-Dimensional multiple input multiple output (FD-MIMO) communication system.
Figure 2:
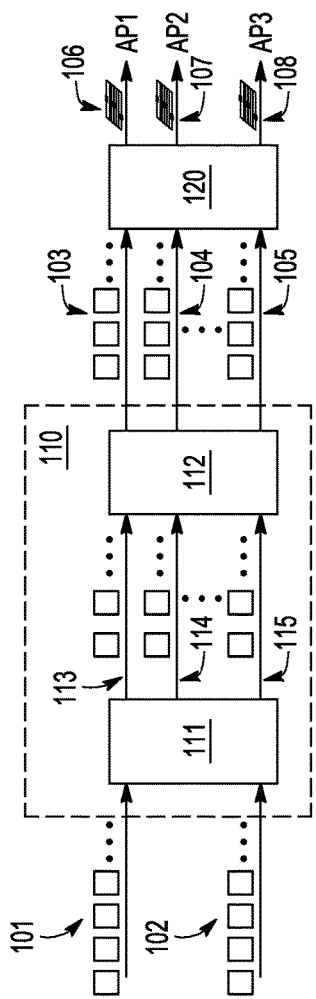
FIG. 2 is a block diagram of part of a conventional transmitting device for a multi-antenna wireless communication system.

FIG. 2 shows a block diagram of part of a conventional transmitting device 100 for a multi-antenna wireless communication system such as the Full-Dimensional multiple input multiple output (FD-MIMO) communication system depicted in FIG. 1. As shown in FIG. 2, conventional transmitting device 100 comprises an antenna mapping unit 110 and a resource-element mapping unit 120. In FIG. 2, antenna mapping unit 110 comprises a layer mapping unit 111 and a precoding unit 112. When conventional transmitting device 100 is in operation, layer mapping unit 111 receives one or more modulation symbols. In an example, the one or more modulation symbols corresponds to coded bits of data information that need to be transmitted on a physical channel of the FD-MIMO communication system. For instance, the one or more modulation symbols are obtained by scrambling the coded bits and modulating the scrambled bits according to a given modulation scheme. In an example, the one or more modulation symbols are complex-valued modulation symbols. In the example of FIG. 2, there are shown two streams 101 and 102 of one or more modulation symbols also known as codewords. Further in operation, mapping unit 111 maps the one or more modulation symbols on one or more transmission layers thereby creating one or more modulated transmission layers. In the example of FIG. 2, there are shown three modulated transmission layers 113, 114 and 115. Later, precoding unit 112 precodes the modulation symbols of the one or more transmission layers for transmission on physical antennas of conventional transmitting device 100. In the example of FIG. 2, precoded symbols 103, 104 and 105 are respectively associated with physical antennas AP1, AP2 and AP3 of conventional transmitting device 100. After the precoding operation, resource-element mapping unit 120 maps the precoded symbols to resource elements on one or more time-frequency resource grids where one time-frequency resource grid is associated with one antenna port. In the example of FIG. 2, time-frequency resource grids 106, 107 and 108 are respectively associated with physical antennas AP1, AP2 and AP3 of conventional transmitting device 100.

Conventional transmission techniques for multi-antenna wireless communication systems are suitable for the processing of a limited number of data. Therefore, such techniques are inappropriate where a large number of beamformed and non beamformed data need to be processed altogether. However, such demanding needs are to be contemplated in future configurations as shown in FIG. 1.

Figure 3:
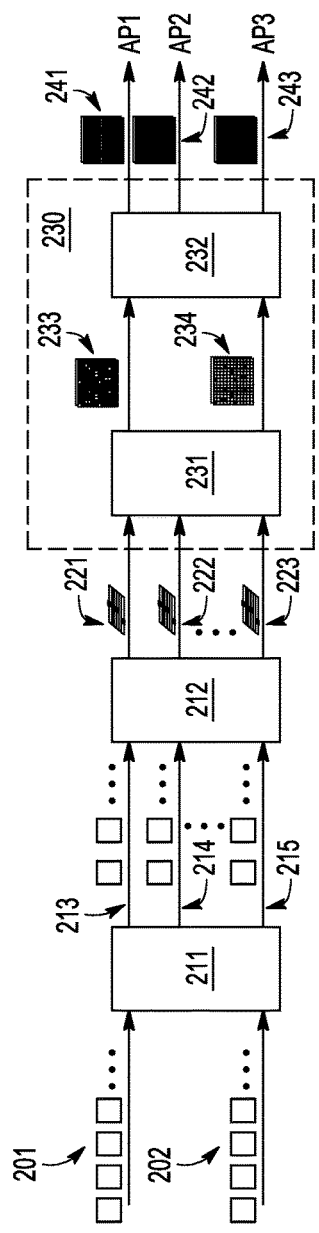
FIG. 3 is a block diagram of part of a transmitting device for a multi-antenna wireless communication system according to embodiments of the innovative subject-matter.

FIG. 3 shows a block diagram of part of a transmitting device 200 such as transmitting device 100, in accordance to an embodiment of the innovative subject-matter. Transmitting device 200 is adapted to support multi-antenna wireless communication systems comprising tens or more active antenna elements in a two-dimensional grid of active antenna arrays as shown in FIG. 1. In addition, conventional configurations such as those supported by conventional transmitting device 100 are also contemplated without necessitating alteration or modification of transmitting device 200.

As shown in FIG. 3, transmitting device 200 comprises a layer mapping unit 211, a resource-element mapping unit 220 and a processing unit 230. In FIG. 3, layer mapping unit 211 is similar to its counterpart described in FIG. 2 with respect to conventional transmitting device 100.

In FIG. 3, when transmitting device 200 is in operation, layer mapping unit 211 receives one or more modulation symbols. In the example of FIG. 3, there are shown two streams 201 and 202 of one or more modulation symbols which are similar to streams 101 and 102 already presented above with respect to conventional transmitting device 100. Further in operation, layer mapping unit 211 maps the one or more modulation symbols on one or more transmission layers thereby creating one or more modulated transmission layers. In an embodiment, the mapping is performed according to a predetermined transmission scheme selected between a single transmit port transmission scheme and a multiple transmit port transmission scheme (e.g. transmit diversity, beamforming, spatial multiplexing). In the example of FIG. 3, there are shown two modulated transmission layers 213, 214 and 215 which are similar to modulated transmission layers 113, 114 and 115 already presented above with respect to conventional transmitting device 100. Later, resource-element mapping unit 220 maps the modulation symbols of modulated transmission layers 213, 214 and 215 onto resource elements of respective one or more time-frequency resource grids. One should note that the foregoing arrangement differs from that of resource-element mapping unit 120 of FIG. 2 in the sense that the processing order has changed. In fact, in the resource-element mapping unit 120, precoded symbols were mapped to resource elements on one or more time-frequency resource grids. However, as with resource-element mapping unit 120, one time-frequency resource grid is associated with one antenna port of conventional transmitting device 100. In the example of FIG. 3, time-frequency resource grids 221, 222 and 223 are respectively associated with physical antennas AP1, AP2 and AP3.

Still in FIG. 3, processing unit 230 is configured to process separately each time-frequency resource grids 221, 222 and 223. As such, processing unit 230 comprises a matrix processor 231 and a matrix precoding unit 232.

Matrix processor 231 comprises a matrix representer and a matrix splitting unit. For ease of illustration, components of matrix processor 231 are not shown in FIG. 3. The matrix representer is a processor that forms a matrix representation of a time-frequency resource grid. In an embodiment, the matrix representer forms the matrix representation by associating each resource element of a time-frequency resource grid to an element of a given matrix. The matrix splitting unit is a processor that splits a matrix formed by the matrix representer into a first matrix and a second matrix according to the following criteria:

the first matrix elements should represent resource elements of a time-frequency resource grid which are to be precoded, and the second matrix elements should represent resource elements of a time-frequency resource grid which are to be discarded from precoding.

For example, in an OFDM-based communication system it is known that a single resource element can carry data from physical channels (e.g. Physical Downlink Shared Channel, Physical Downlink Control Channel and Common Control Physical Channel) or physical signals (e.g. Reference signals and Synchronization signals). In that case, the first matrix elements could correspond to data from physical channels and should be precoded while the second matrix elements could correspond to data from physical signals and shouldn't be precoded.

In the example of FIG. 3, there are shown a first matrix 233 and a second matrix 234. In an example, first matrix 233 and second matrix 234 are of the same dimension as the matrix formed by the matrix representer and first matrix 233 is a complement of the second matrix 234. This means that if first matrix 233 and second matrix 234 were to be superposed, none of the respective resource element would coincide. Said in other words, a resource element can only be associated with one of first matrix 233 and second matrix 234, at a time, according to the above-mentioned rules. Therefore, where a resource element is associated with one of first matrix 233 and second matrix 234 according to the above-mentioned rules, that resource element can no longer be associated with the other matrix.

In an embodiment, the matrix splitting unit performs the splitting based on at least one received predetermined splitting map associated with the one or more time-frequency resource grids. In another embodiment, the matrix splitting unit performs the splitting based on at least one stored predetermined splitting map associated with the one or more time-frequency resource grids. For instance, the splitting map may be stored in a memory of the transmitting device 200. In an example of the foregoing embodiments, the splitting map is a data source such as a text file coded so as to distinctively distinguish the resource elements of the time-frequency resource grid to be precoded and the resource elements of the time-frequency resource grid to be discarded from precoding.

Figure 4:
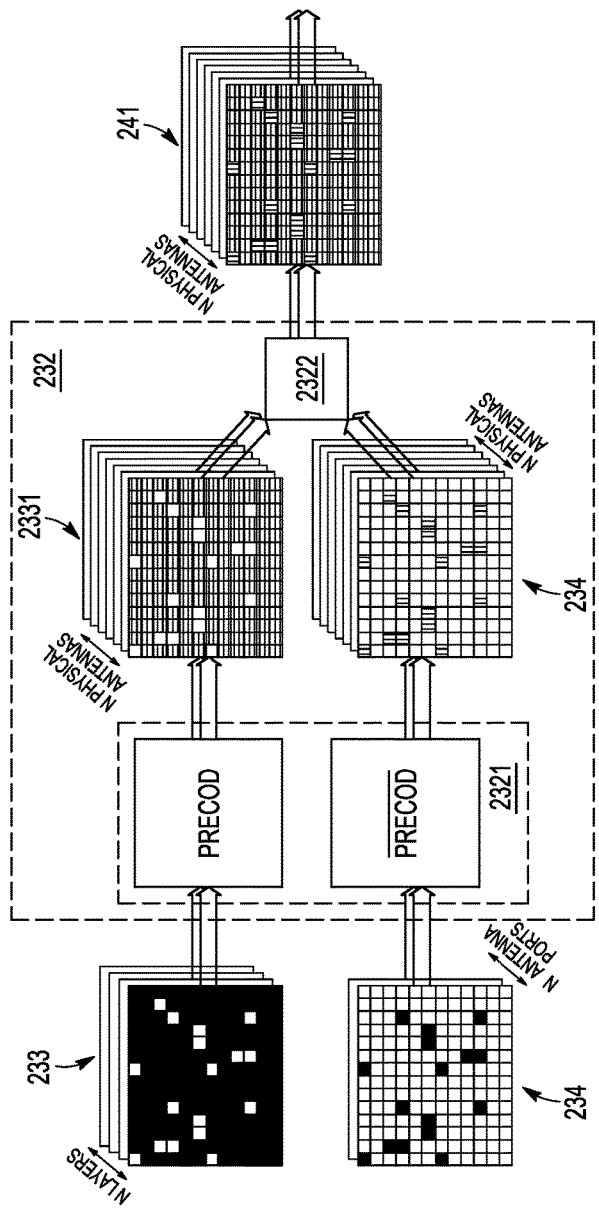
FIG. 4 is a block diagram illustrating a matrix merging unit according to embodiments of the innovative subject-matter.

Matrix precoding unit 232 comprises a single instruction stream multiple data stream (SIMD) processor and a matrix merging unit. For ease of illustration, components of matrix precoding unit 232 are not shown in FIG. 3, but are shown in FIG. 4 with references 2321 and 2322. One should note that a SIMD processor uses a set of operations to efficiently handle large quantities of data in parallel. SIMD processors are sometimes referred to as vector processors or array processors because they handle the data in vectors or arrays. The difference between a vector unit and scalar units is that the vector unit handles multiple pieces of data simultaneously, in parallel with a single instruction. For example, a single instruction to add one 128-bit vector to another 128-bit vector results in up to 16 numbers being added simultaneously.

SIMD processor 2321 as shown in FIG. 4 is arranged for precoding first matrix 233, thereby creating a precoded first matrix. As already explained above, the precoding operation may be based on channel state information (CSI) received at the Base Station (BS) from the User Equipment (UE). Further, the precoding may be performed according to at least one of the following precoding methods: conjugate beamforming (also known as maximum ratio transmission), block diagonalization, regularized block diagonalization signal-to-leakage plus noise ratio (SLNR), or minimum mean-square error estimation (MMSE). In the example of FIG. 4, there is shown one precoded first matrix 2331 obtained from first matrix 233 through SIMD processor 2321. Regarding second matrix 234, SIMD processor 2321 does not apply any processing since the resource elements comprised in second matrix 234 should not be precoded as already explained above. In a nutshell, while in operation, SIMD processor 2321 precodes first matrix 233 and discards second matrix 234 from precoding. This arrangement is advantageous because in that case the precoding operation is agnostic to the mapping of a time-frequency resource grid, which makes the precoding more efficient. Indeed, the precoding operation is mainly made by matrix computation which is well adapted to be processed by SIMD processor 2321. In the example of FIG. 4, SIMD processor 2321 comprises a first unit PRECOD for handling first matrix 233 and a second unit $\overline{\text{PRECOD}}$ for handling second matrix 234. However, other configurations are contemplated without necessitating any modification of the innovative subject-matter. For instance, SIMD processor 2321 may comprise a single unit for performing the functions of first unit PRE-COD and second unit $\overline{\text{PRECOD}}$.

Matrix merging unit 2322 as shown in FIG. 4 is a processor that merges precoded first matrix 2331 with second matrix 234, thereby creating a precoded matrix representation of a precoded time-frequency resource grid. In the example of FIG. 3, there are shown three precoded matrices 241, 242 and 243 which are respectively associated with time-frequency resource grids 221, 222 and 223.

In a first embodiment, matrix merging unit 2322 creates the precoded matrix by summing precoded first matrix 2331 and second matrix 234. In an example of the first embodiment, before performing the merging, matrix merging unit 2322 sets to zero the matrix elements of precoded first matrix 2331 and second matrix 234 which are not associated with a resource element. In another example, the setting to zero operation is performed by matrix processor 231 on first matrix 233 and second matrix 234. For example, this could be performed by the matrix splitting unit as described above.

In a second embodiment, matrix merging unit 2322 creates the precoded matrix overwriting precoded first matrix 2331 with second matrix 234. In an example of the second embodiment, before performing the merging, matrix merging unit 2322 provides an empty precoded matrix having the same dimension as precoded first matrix 2331 and second matrix 234, and where all matrix elements are set to a least one value. On should note that in this example, matrix elements of the empty precoded matrix can be set to whatever value. Further, matrix merging unit 2322 selects the matrix elements of precoded first matrix 2331 and second matrix 234 which are associated with a resource element. Finally, matrix merging unit 2322 overwrites the matrix elements of the empty precoded matrix with the corresponding selected matrix elements.

In a particular embodiment, the matrix splitting unit is further configured for splitting first matrix 233 into at least two sub-matrices which when concatenated form first matrix 233. Further in that embodiment, SIMD processor 2321 as shown in FIG. 4 is further configured for creating above-mentioned precoded first matrix 2331 based on the at least two sub-matrices. In that particular embodiment, SIMD processor 2321 may process separately each of the sub-matrices and may comprise a matrix merging unit similar to matrix merging unit 2322 for forming precoded first matrix 2331 based on the processed sub-matrices. In another arrangement, SIMD processor 2321 may comprise a plurality of SIMD processors in order to process in parallel each of the sub-matrices and may comprise a matrix merging unit similar to matrix merging unit 2322 for forming precoded first matrix 2331 based on the processed sub-matrices.

Returning back to FIG. 3, transmitting device 200 further comprises a time-frequency grid generator for generating a precoded time-frequency resource grid based on the precoded matrix and a transmitter for transmitting the precoded time-frequency resource grid over the multi-antenna wireless communication system. For ease of illustration, the time-frequency grid generator and the transmitter are not shown in FIG. 3.

Figure 5:
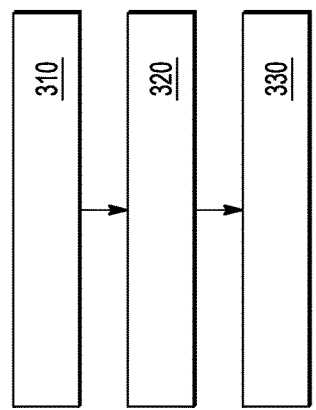
FIG. 5 is a flow chart of a signal transmission method for a multi-antenna wireless communication system according to an embodiment of the innovative subject-matter.

Further, as shown in FIG. 5, embodiments of the proposed solution may also be implemented for performing signal transmission method for a multi-antenna wireless communication system. Such method may include:
- at S310, mapping the received modulation symbols onto one or more transmission layers, thereby creating one or more modulated transmission layers;
- at S320, mapping the modulation symbols of the one or more modulated transmission layers onto resource blocks of respective one or more time-frequency resource grids; and
- at S330, performing the following steps for each of the one or more time-frequency resource grids:
    * forming a matrix representation of the time-frequency resource grid;
    * splitting the formed matrix into a first matrix and a second matrix wherein, the first matrix elements represent resource blocks of the time-frequency resource grid to be precoded and the second matrix elements represent resource blocks of the time-frequency resource grid to be discarded from precoding;
    * precoding the first matrix by a single instruction stream multiple data stream (SIMD) processor, thereby creating a precoded first matrix;
    * merging the precoded first matrix with the second matrix, thereby creating a precoded matrix representing of a precoded time-frequency resource grid;
    * generating a precoded time-frequency resource grid based on the precoded matrix; and
    * transmitting the precoded time-frequency resource grid over the wireless communication system.

In embodiments of the method, the forming operation is performed by associating each resource element of the time-frequency resource grid to an element of a matrix.

In other embodiments of the method, the splitting operation is performed base on at least one received predetermined splitting map associated with the one or more time-frequency resource grids.

In alternative embodiments of the method, the splitting operation is performed base on at least one stored predetermined splitting map associated with the one or more time-frequency resource grids.

In embodiments of the previous embodiments, the splitting map is so coded to distinctively distinguish the resource elements of the time-frequency resource grid to be precoded and the resource elements of the time-frequency resource grid to be discarded from precoding.

In one embodiment of the method, the first matrix and the second matrix are of the same dimension as the formed matrix and the first matrix is a complement of the second matrix.

In first embodiments of the previous embodiment, the merging consists in summing the precoded first matrix and the second matrix. In an example, before performing the merging, it is set to zero the matrix elements of the precoded first matrix and the second matrix which are not associated with a resource element.

In second embodiments of the previous embodiment, the merging consists in overwriting the precoded first matrix with the second matrix. In an example, before performing the merging there is provided an empty precoded matrix having the same dimension as the precoded first matrix and the second matrix. Then, there is selected the matrix elements of the precoded first matrix and the second matrix which are associated with a resource element. Finally, there is overwritten the matrix elements of the empty precoded matrix with the corresponding selected matrix elements, thereby creating the precoded first matrix.

In embodiments of the method, the first matrix is split into at least two sub-matrices which when concatenated form the first matrix. Further, the precoded first matrix is created based on the at least two sub-matrices.

In other embodiments of the method, there is performed the mapping of the one or more modulation symbols to one or more transmission layers according to a predetermined transmission scheme selected between a single transmit port transmission scheme and a multiple transmit port transmission scheme.

The above-proposed method may also be performed by a computer program embodied in a non-transitory computer readable storage medium.

In the foregoing specification, the proposed solution has been described with reference to specific examples of embodiments of the proposed solution. It will, however, be evident that various modifications and changes may be made therein without departing from the broader scope of the proposed solution as set forth in the appended claims. For instance, one should note that the above-mentioned multi-antenna wireless communication system may be an OFDM-based communication system, such as: fourth generation (4G), fifth generation (5G) wireless systems, and other new generation of wireless systems or a mix of such communication systems.

Embodiments of signal transmission methods for a multi-antenna wireless communication system have been described herein. The method comprises mapping one or more modulation symbols onto one or more transmission layers, thereby creating one or more modulated transmission layers and mapping the modulation symbols of the one or more modulated transmission layers onto resource elements of respective one or more time-frequency resource grids. The method further comprises performing the following steps for each of the one or more time-frequency resource grids:

forming a matrix representation of the time-frequency resource grid;

splitting the formed matrix into a first matrix and a second matrix wherein the first matrix elements represent resource elements of the time-frequency resource grid to be precoded and the second matrix elements represent resource elements of the time-frequency resource grid to be discarded from precoding;

precoding the first matrix by a single instruction stream multiple data stream (SIMD) processor, thereby creating a precoded first matrix;

merging the precoded first matrix with the second matrix, thereby creating a precoded matrix representation of a precoded time-frequency resource grid;

generating a precoded time-frequency resource grid based on the precoded matrix; and transmitting the precoded time-frequency resource grid over the multi-antenna wireless communication system.

Embodiments of a transmitting device for a multi-antenna wireless communication system also have been described herein. The transmitting device comprises a layer mapping unit for mapping one or more modulation symbols onto one or more transmission layers, thereby creating one or more modulated transmission layers, a resource element mapping unit for mapping the modulation symbols of the one or more modulated transmission layers onto resource elements of respective one or more time-frequency resource grids, a processing unit for processing each of the one or more time-frequency resource grids, a time-frequency grid generator for generating a precoded time-frequency resource grid based on a precoded matrix and a transmitter for transmitting a precoded time-frequency resource grid over the multi-antenna wireless communication system. The processing unit comprises a matrix processor and a matrix precoding unit. The matrix processor comprises a matrix representer for forming a matrix representation of the time-frequency resource grid and a matrix splitting unit for splitting the formed matrix into a first matrix and a second matrix wherein the first matrix elements represent resource elements of the time-frequency resource grid to be precoded and the second matrix elements represent resource elements of the time-frequency resource grid to be discarded from precoding. The matrix precoding unit comprises a single instruction stream multiple data stream (SIMD) processor for precoding the first matrix, thereby creating a precoded first matrix and a matrix merging unit for merging the precoded first matrix with the second matrix, thereby creating a precoded matrix representation of a precoded time-frequency resource grid.

Embodiments of the transmitting device may be embodied as a hardware module and/or integrated circuit that include various processing units and/or logic blocks configured to perform the functionality of the units. Embodiments of the transmitting device may be incorporated into a transmitter system, which also includes a power amplifier and an antenna. The power amplifier is coupled to the device to receive a signal to be transmitted, where the power amplifier amplifies the received signal, and provides the amplified signal to the amplifier for transmission over an air interface.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality. In addition, any above advantages are exemplary, and those or other advantages may be achieved by the proposed embodiments. Further, one of skill in the art may appreciate that not all advantages stated above are necessarily achieved by embodiments described herein.

For instance the overall processing may be split between a baseband unit (BBU 16) and remote radio head (RRH). In an example, operations occurring before the precoding are performed at the BBU 16 while operations occurring after the precoding are performed at the RRH. In another example, the processing of the matrix elements discarded from precoding may be performed by the RRH. In another arrangement, the processing of the static matrix elements (e.g. Cell-Specific Reference Signals in LTE communication systems) discarded from precoding may be performed by the RRH while the processing of the dynamic matrix elements discarded from precoding may be performed by the BBU.

The preceding description has been presented with reference to a single instruction stream multiple data stream processor. However, persons skilled in the art and technology to which this invention pertains will appreciate that the foregoing teachings may be applied to a multiple instruction stream multiple data stream processor.

Any arrangement of devices to achieve the same functionality is effectively "associated" such that the desired functionality is achieved. Hence, any two devices herein combined to achieve a particular functionality may be seen as "associated with" each other such that the desired functionality is achieved, irrespective of architectures or intermediate devices. Likewise, any two devices so associated can also be viewed as being "operably connected," or "operably coupled," to each other to achieve the desired functionality.

Furthermore, those skilled in the art will recognize that boundaries between the above described operations are merely illustrative. When multiple operations are discussed or illustrated, the multiple operations may be combined into a single operation, a single operation may be distributed in additional operations, and operations may be executed at least partially overlapping in time. Moreover, alternative embodiments may include multiple examples of a particular operation, and the order of operations may be altered in various other embodiments. Various other modifications, variations and alternatives are also possible. The specifications and drawings are, accordingly, to be regarded in an illustrative rather than in a restrictive sense.

In the claims, any reference signs placed between parentheses shall not be construed as limiting the claim. As used herein, the word 'comprising' does not exclude the presence of other elements or operations then those listed. Furthermore, the terms "a" or "an," as used herein, are defined as one or as more than one. Also, the use of introductory phrases such as "at least one" and "one or more" should not be construed to imply that the introduction of another element by the indefinite articles "a" or "an" limits any particular embodiment containing such introduced element to inventions containing only one such element. The same holds true for the use of definite articles. Unless stated otherwise, terms such as "first" and "second" are used to arbitrarily distinguish between the elements of an embodiment that such terms describe. Thus, these terms are not necessarily intended to indicate temporal or other prioritization of such elements.

The invention claimed is:

1. A signal transmission method for a multi-antenna wireless communication system, the method comprising:
mapping one or more modulation symbols onto one or more transmission layers, thereby creating one or more modulated transmission layers;
mapping the modulation symbols of the one or more modulated transmission layers onto resource elements of respective one or more time-frequency resource grids; and
for each of the one or more time-frequency resource grids:
forming a matrix representation of the time-frequency resource grid,
splitting the formed matrix into a first matrix and a second matrix wherein the first matrix elements represent resource elements of the time-frequency resource grid to be precoded, and the second matrix elements represent resource elements of the time-frequency resource grid to be discarded from precoding, wherein the splitting is based on at least one received or stored predetermined splitting map associated with one or more time-frequency source grids,
precoding the first matrix by a single instruction stream multiple data stream processor, thereby creating a precoded first matrix,
merging the precoded first matrix with the second matrix, thereby creating a precoded matrix representation of a precoded time-frequency resource grid,
generating a precoded time-frequency resource grid based on the precoded matrix, and
transmitting the precoded time-frequency resource grid over the multi-antenna wireless communication system.

2. The method of claim 1, further comprising:
forming the matrix representation by associating each resource element of the time-frequency resource grid to an element of a matrix.

3. The method of claim 1, further comprising:
performing the splitting based on at least one received predetermined splitting map associated with the one or more time-frequency resource grids.

4. The method of claim 1, further comprising:
performing the splitting based on at least one stored predetermined splitting map associated with the one or more time-frequency resource grids.

5. The method of claim 3 further comprising:
coding the splitting map to distinctively distinguish the resource elements of the time-frequency resource grid to be precoded and the resource elements of the time-frequency resource grid to be discarded from precoding.

6. The method of claim 1, further comprising:
splitting the first matrix into at least two sub-matrices which when concatenated form the first matrix, and
creating the precoded first matrix based on the at least two sub-matrices.

7. The method of claim 1, further comprising:
mapping the one or more modulation symbols to one or more transmission layers according to a predetermined transmission scheme selected between a single transmit port transmission scheme and a multiple transmit port transmission scheme.

8. A signal transmission method for a multi-antenna wireless communication system, the method comprising:
mapping one or more modulation symbols onto one or more transmission layers, thereby creating one or more modulated transmission layers;
mapping the modulation symbols of the one or more modulated transmission layers onto resource elements of respective one or more time-frequency resource grids; and
for each of the one or more time-frequency resource grids:

forming a matrix representation of the time-frequency resource grid,
splitting the formed matrix into a first matrix and a second matrix wherein the first matrix elements represent resource elements of the time-frequency resource grid to be precoded, and the second matrix elements represent resource elements of the time-frequency resource grid to be discarded from precoding,
precoding the first matrix by a single instruction stream multiple data stream processor, thereby creating a precoded first matrix,
merging the precoded first matrix with the second matrix, thereby creating a precoded matrix representation of a precoded time-frequency resource grid,
generating a precoded time-frequency resource grid based on the precoded matrix, and
transmitting the precoded time-frequency resource grid over the multi-antenna wireless communication system, wherein,
the first matrix and the second matrix are of the same dimension as the formed matrix, and
the first matrix is a complement of the second matrix.

9. The method of claim 8, wherein the merging consists in summing the precoded first matrix and the second matrix.

10. The method of claim 9, further comprising before performing the merging:
setting to zero the matrix elements of the precoded first matrix and the second matrix which are not associated with a resource element.

11. The method of claim 8, wherein the merging consists in overwriting the precoded first matrix with the second matrix.

12. The method of claim 11, further comprising before performing the merging:
providing an empty precoded matrix having the same dimension as the precoded first matrix and the second matrix;
selecting the matrix elements of the precoded first matrix and the second matrix which are associated with a resource element; and
overwriting the matrix elements of the empty precoded matrix with the corresponding selected matrix elements, thereby creating the precoded first matrix.

13. The method of claim 8, further comprising:
splitting the first matrix into at least two sub-matrices which when concatenated form the first matrix, and
creating the precoded first matrix based on the at least two sub-matrices.

14. The method of claim 8, further comprising:
mapping the one or more modulation symbols to one or more transmission layers according to a predetermined transmission scheme selected between a single transmit port transmission scheme and a multiple transmit port transmission scheme.

15. A transmitting device for a multi-antenna wireless communication system, comprising:
a layer mapping unit configured to map one or more modulation symbols onto one or more transmission layers, thereby creating one or more modulated transmission layers;
a resource element mapping unit configured to map the modulation symbols of the one or more modulated transmission layers onto resource elements of respective one or more time-frequency resource grids; and
a processing unit configured to process each of the one or more time-frequency resource grids, the processing unit comprising:
a matrix processor comprising
a matrix representer configured to form a matrix representation of the time-frequency resource grid, and
a matrix splitting unit configured to split the formed matrix into a first matrix and a second matrix wherein the first matrix elements represent resource elements of the time-frequency resource grid to be precoded, and the second matrix elements represent resource elements of the time-frequency resource grid to be discarded from precoding,
a matrix precoding unit comprising
a single instruction stream multiple data stream, SIMD, processor configured to precode the first matrix, thereby creating a precoded first matrix, and
a matrix merging unit configured to merge the precoded first matrix with the second matrix, thereby creating a precoded matrix representation of a precoded time-frequency resource grid,
a time-frequency grid generator configured to generate a precoded time-frequency resource grid based on a precoded matrix, and
a transmitter configured to transmit a precoded time-frequency resource grid over the multi-antenna wireless communication system,
wherein the matrix splitting unit is configured to operate based on at least one predetermined splitting map associated with the one or more time-frequency resource grids, the splitting map being received at the transmitting device or stored in a memory of the transmitting device.

16. The transmitting device of claim 15, wherein:
the matrix splitting unit is further configured to split the first matrix into at least two sub-matrices which when concatenated form the first matrix, and
the SIMD processor is further configured to create a precoded first matrix based on the at least two sub-matrices.

17. The transmitting device of 15, wherein the layer mapping unit is configured to map the one or more modulation symbols to one or more transmission layers according to a predetermined transmission scheme selected between a single transmit port transmission scheme and a multiple transmit port transmission scheme.

18. The transmitting device of 15, wherein the communication channel is an OFDM-based communication system.

19. A transmitting device for a multi-antenna wireless communication system, comprising:
a layer mapping unit configured to map one or more modulation symbols onto one or more transmission layers, thereby creating one or more modulated transmission layers;
a resource element mapping unit configured to map the modulation symbols of the one or more modulated transmission layers onto resource elements of respective one or more time-frequency resource grids; and
a processing unit configured to process each of the one or more time-frequency resource grids, the processing unit comprising:

a matrix processor comprising
  a matrix representer configured to form a matrix representation of the time-frequency resource grid, and
  a matrix splitting unit configured to split the formed matrix into a first matrix and a second matrix wherein the first matrix elements represent resource elements of the time-frequency resource grid to be precoded, and the second matrix elements represent resource elements of the time-frequency resource grid to be discarded from precoding,
a matrix precoding unit comprising
  a single instruction stream multiple data stream, SIMD, processor configured to precode the first matrix, thereby creating a precoded first matrix, and
  a matrix merging unit configured to merge the precoded first matrix with the second matrix, thereby creating a precoded matrix representation of a precoded time-frequency resource grid,
  a time-frequency grid generator configured to generate a precoded time-frequency resource grid based on a precoded matrix, and
  a transmitter configured to transmit a precoded time-frequency resource grid over the multi-antenna wireless communication system, wherein,
    the first matrix and the second matrix are of the same dimension as the formed matrix, and
    the first matrix is a complement of the second matrix.

20. The transmitting device of claim 19, wherein the matrix merging unit is configured to sum the precoded first matrix and the second matrix.

21. The transmitting device of claim 19, wherein the matrix merging unit is configured to overwrite the precoded first matrix with the second matrix.

* * * * *